United States Patent
Grosskopf et al.

(10) Patent No.: US 10,518,741 B2
(45) Date of Patent: Dec. 31, 2019

(54) SEAT BELT RETRACTOR

(71) Applicant: TRW Automotive GmbH, Alfdorf (DE)

(72) Inventors: Anna Grosskopf, Schäbisch Gmünd (DE); Jens Bohn, Alfdorf (DE); Thomas Kielwein, Eschach (DE); Beate Pfister, Bietigheim (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 225 days.

(21) Appl. No.: 15/522,333

(22) PCT Filed: Sep. 29, 2015

(86) PCT No.: PCT/EP2015/002081
§ 371 (c)(1),
(2) Date: Apr. 27, 2017

(87) PCT Pub. No.: WO2016/066252
PCT Pub. Date: May 6, 2016

(65) Prior Publication Data
US 2018/0001867 A1  Jan. 4, 2018

(30) Foreign Application Priority Data

Oct. 30, 2014 (DE) .................. 10 2014 015 932

(51) Int. Cl.
*B60R 22/28* (2006.01)
*B60R 22/34* (2006.01)
*B60R 22/46* (2006.01)

(52) U.S. Cl.
CPC .......... *B60R 22/3413* (2013.01); *B60R 22/28* (2013.01); *B60R 22/4676* (2013.01);
(Continued)

(58) Field of Classification Search
CPC .. B60R 22/28; B60R 22/3413; B60R 22/4676
See application file for complete search history.

(56) References Cited

U.S. PATENT DOCUMENTS

2004/0056136 A1* 3/2004 Blum .................. B60R 22/3413
  242/379.1
2006/0163410 A1* 7/2006 Blum .................. B60R 22/3413
  242/379.1
(Continued)

FOREIGN PATENT DOCUMENTS

| DE | 20015402 | 2/2001 |
|----|----------|--------|
| DE | 102006023258 | 10/2007 |
| DE | 102007050867 | 4/2009 |

*Primary Examiner* — Sang K Kim
(74) *Attorney, Agent, or Firm* — Tarolli, Sundheim, Covell & Tummino LLP (57) ABSTRACT

In a seat belt retractor (12) for a vehicle, comprising a frame (14) in which a belt reel (10) is supported which includes a reel body (26) as wed as a first flange (32) and a second flange (34), said flanges being provided at the axial ends (28, 30) of the reel body (26) and each being arranged in a seat (22) of the frame (14), wherein the first flange (32) is rotatable relative to the reel body (26) and wherein between the first flange (32) and the reel body (26) a force limiter is provided, and at the seat (22) locking teeth (24) are provided and at the first flange (32) a toothing corresponding to the locking teeth is provided, the second flange (34) is rotatable relative to the reel body (26) and at the second flange (34) and/or at the reel body (26) interacting stops (50, 54, 58) are provided for limiting rotation of the second flange (34) relative to the reel body (26). Furthermore, the second flange (34) Includes a peripheral wall (44) which encloses the axial end (30) of the reel body (26) facing the second flange (34) in the peripheral direction.

11 Claims, 6 Drawing Sheets

(52) U.S. Cl.
CPC ... *B60R 2022/286* (2013.01); *B60R 2022/287* (2013.01); *B60R 2022/288* (2013.01)

(56) References Cited

U.S. PATENT DOCUMENTS

| | | | |
|---|---|---|---|
| 2009/0014577 A1* | 1/2009 | Elsaesser | B60R 22/3413 242/487.6 |
| 2015/0210247 A1* | 7/2015 | Liu | B60R 22/34 242/379.1 |
| 2016/0311397 A1* | 10/2016 | Hasse | B60R 22/3413 |

* cited by examiner

SEAT BELT RETRACTOR

RELATED APPLICATIONS

This application corresponds to PCT/EP2015/002081, filed Sep. 29, 2015, which claims the benefit of German Application No. 10 2014 015 932.9, filed Oct. 30, 2014, the subject matter of which are incorporated herein by reference in their entirety.

BACKGROUND OF THE INVENTION

The invention relates to a seat belt retractor for a vehicle, comprising a frame in which a belt reel is supported which includes a reel body as well as a first flange and a second flange, the flanges being provided at the axial ends of the reel body and each being arranged in a seat of the frame, wherein the first flange is rotatable relative to the reel body and wherein between the first flange and the reel body a force limiter is provided and at, the seat locking teeth are provided and at the first flange a toothing corresponding to the locking teeth is provided.

Belt reels for a seat belt retractor in a vehicle comprise a base onto which webbing can be wound as well as two flanges provided at the axial ends of the base, the flanges supporting the belt reel within a frame of a belt retractor. Usually the belt reel is blocked by the fact that one or both flanges are fixed or blocked in the frame. A force limiter disposed between the base and the flange frequently enables limited rotation and thus limited webbing extension even when the flanges are blocked so that the forces acting on the vehicle occupant can be reduced.

In order to limit such rotation stops are frequently provided for blocking further rotation after a defined angle of rotation of the base relative to the flanges. Said stops may form a further force limiter by one of said stops being designed as a blade adapted to plane the chips off the respective other stop. The shape of the projections facilitates progressive force limitation, for example, so that after a particular number of revolutions no further rotation of the belt reel relative to the flanges is possible.

The design of said flanges frequently is very complicated. In addition, it is necessary to fix the flanges on the belt reel in the axial direction, as the functioning of said stops and, resp., of such force limiter might be impaired by axial play. For example, the blade of a cutting force limiter formed by the stops may tilt due to axial play. Moreover, the chips planed off in such force limiter are not desired to be provided loosely inside the belt retractor.

SUMMARY OF THE INVENTION

It is the object of the invention to provide a seat belt retractor of the afore-mentioned type which has a stable structure and, in this way, enables reliable force limitation and, resp., blocking of the seat belt.

For achieving the object a seat belt retractor for a vehicle is provided comprising a frame in which a belt reel is supported which includes a reel body as well as a first flange and a second flange, the flanges being provided at the axial ends of the reel body and each being arranged in a seat of the frame, wherein the first flange is rotatable relative to the reel body and wherein between the first flange and the reel body a force limiter is provided, and at the seat locking teeth are provided and at the first flange a toothing corresponding to the locking teeth is provided. In accordance with the invention, the second flange is rotatable relative to the reel body and at the second flange and/or at the reel body interacting stops are provided for limiting rotation of the second flange relative to the reel body, and the second flange includes a peripheral wall enclosing the axial end of the reel body facing the second flange in the peripheral direction.

The second flange thus is pot-shaped and encloses the axial end of the base. On the one hand, this allows for better support of the belt reel and, resp., the base on the frame, as the frame in this way can act on the second flange level with the reel body. In addition, the second flange cannot axially slip off the base so that the belt reel is designed to be more stable and the stops can reliably interact. Moreover, chips occurring during force limitation are collected in the second flange so that they cannot loosely drop out of the belt reel.

Preferably, at the first flange a toothing is provided and at the seat of the first flange corresponding locking teeth are provided so that the belt reel is moved into the locking teeth by pivoting within the frame and is blocked.

In order to ensure optimum load transmission from the belt reel to the frame of the seat belt retractor, preferably on the outside of the peripheral wall a toothing is provided and at the seat of the second flange corresponding locking teeth are provided into which the toothing can engage. This allows for direct load transmission and, resp., support of the reel body on the frame.

For example, the toothing may be formed by appropriate embossing of the peripheral wall or corresponding projections on the peripheral wall. In order to reduce the weight of the flange and thus of the belt reel and to facilitate manufacture of the flange, the toothing is preferably formed by interruptions of the peripheral wall, however. In this way, on the one hand, smaller material thickness of the peripheral wall can be realized. On the other hand, the toothing can be easily manufactured by stamping or curling out the recesses or the interruptions.

Simple manufacture of the second flange is possible by configuring the same of a one-piece, especially flat sheet metal part. Said sheet metal part is reformed so that the peripheral wall is formed integrally with the residual flange, in particular, the interruptions of the peripheral wall forming the toothing may be introduced to the sheet metal part prior to reforming the same, i.e. the still flat sheet metal part can be machined so that after reforming it is not required to further introduce any interruptions or other recesses.

The stops at the second flange and at the reel body may be formed in different ways. It is Imaginable, for example, that they are radially inwardly and/or outwardly projecting, in order to reduce the diameter of the belt reel and, resp., of the flanges, the stops are preferably provided in the axial direction opposed to the second flange and to the reel body. This is especially advantageous when the toothing is formed on the outside of the peripheral wall by interruptions of the peripheral wall.

The stop at the second flange is formed, for example, by a projection. Especially, said projection is formed by embossing, which enables such stop to be easily introduced. Such stop may also be manufactured prior to reforming the sheet metal part, for example in one working step with stamping out the interruptions which form the toothing.

The stop on the reel body may be integrated in the reel body or may be formed by a bolt which protrudes from the reel body in the axial direction. Since said bolt is supported in a recess within the reel body, proper backing of said bolt is ensured. In addition, merely one recess has to be provided on the reel body.

The stop in the reel body may be replaced by a blade so that in the case of high forces the opposite stop is radially abraded so that an additional progressive or declining force limitation is possible, if excessive forces act on the belt reel and the webbing, respectively.

Between the second flange and the reel body in addition a shear pin having a predetermined breaking point may be provided which admits relative movement of the second flange and the reel body only when a defined force level is exceeded.

The force limiter between the first flange and the reel body may be a torsion rod, for example, which requires small constructed space inside the reel body so that the space for the belt reel can be reduced.

BRIEF DESCRIPTION OF THE DRAWINGS

Further advantages and features are found in the following description in connection with the enclosed drawings, wherein.

DESCRIPTION

Figure 1:
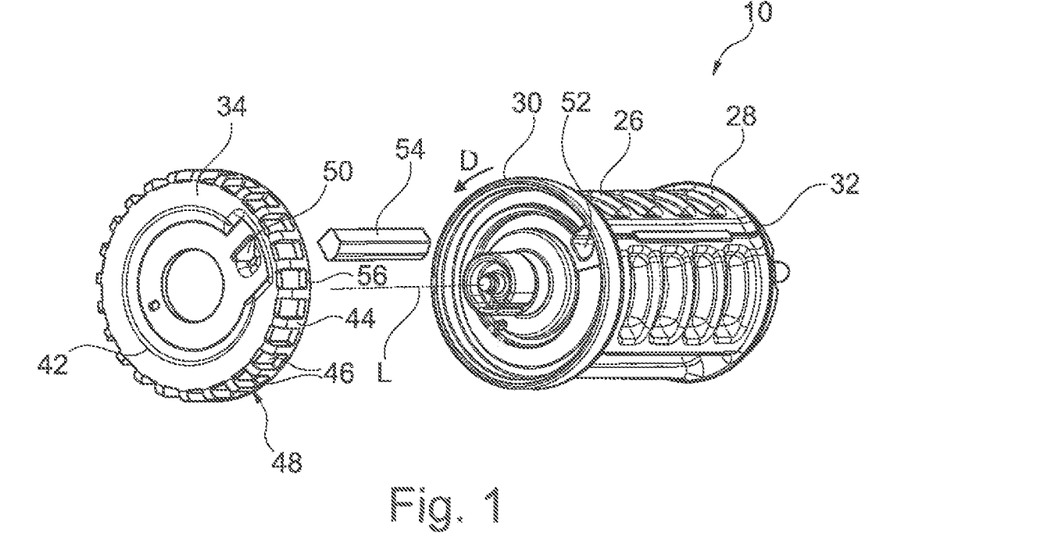
FIG. 1 shows an exploded view of a belt reel according to the invention.
Figure 2:
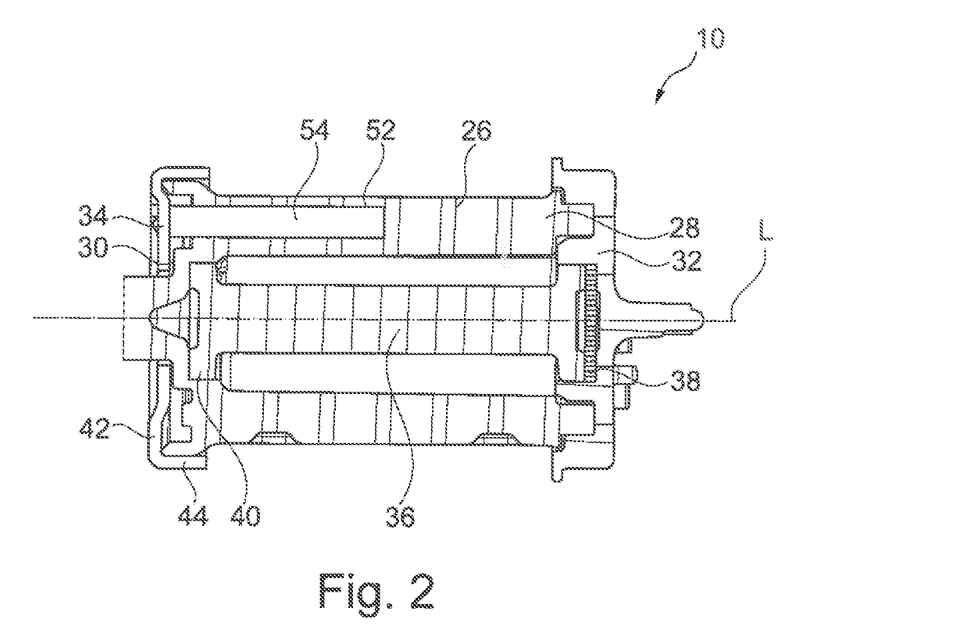
FIG. 2 shows a sectional view across the belt reel of FIG. 1.
Figure 3:
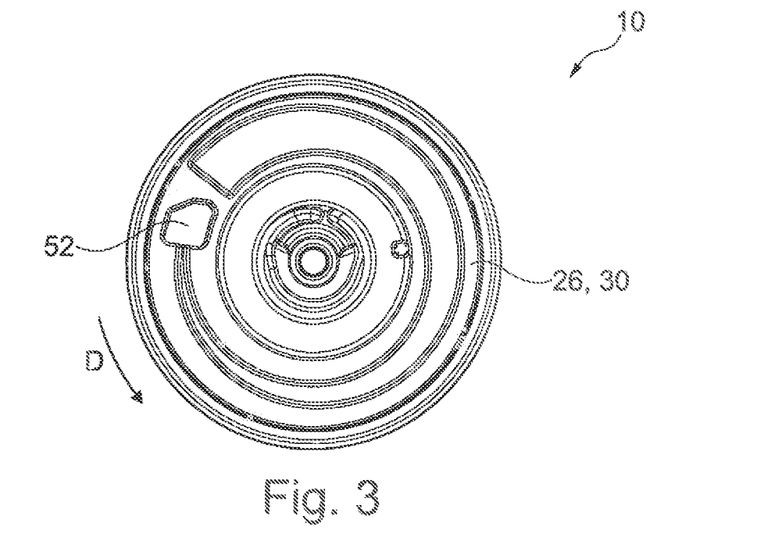
FIG. 3 shows an axial top view onto the belt reel of FIG. 2.
Figure 4:
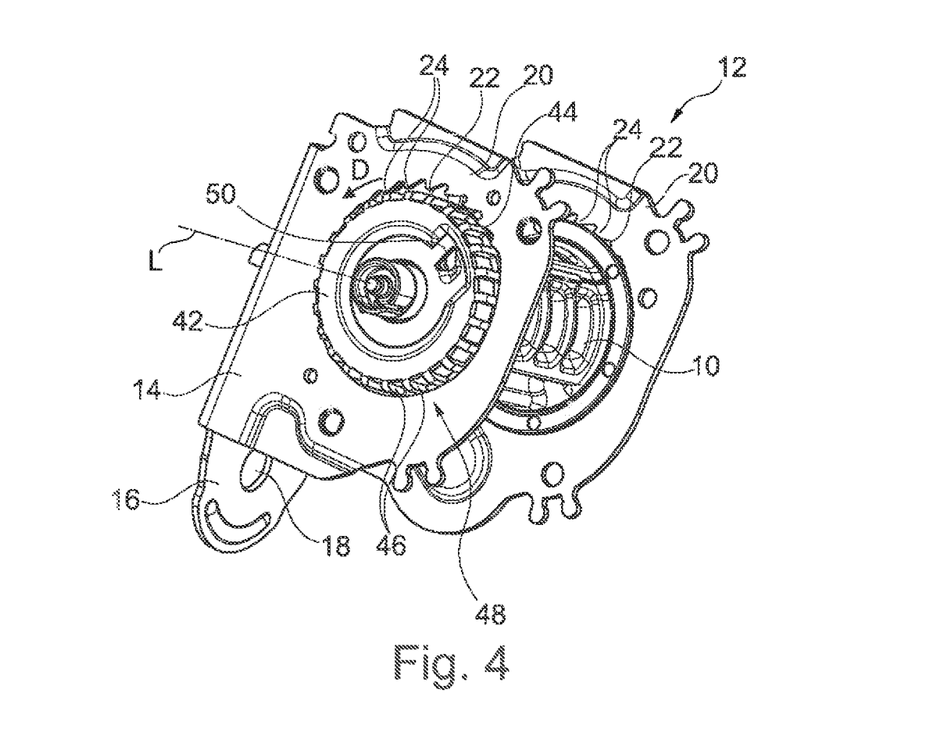
FIG. 4 shows a perspective view of a seat belt retractor comprising the belt reel of FIGS. 1 to 3.
Figure 5:
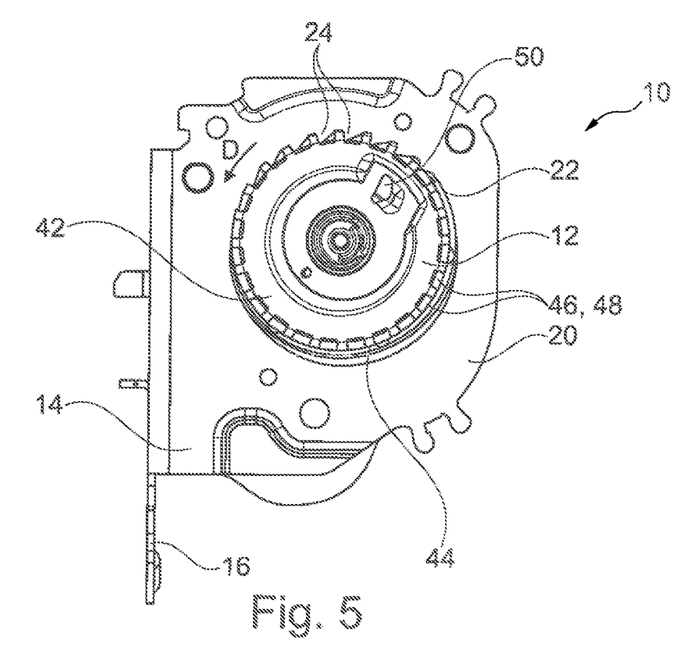
FIG. 5 shows an axial top view onto the seat belt retractor of FIG. 4.
Figure 6:
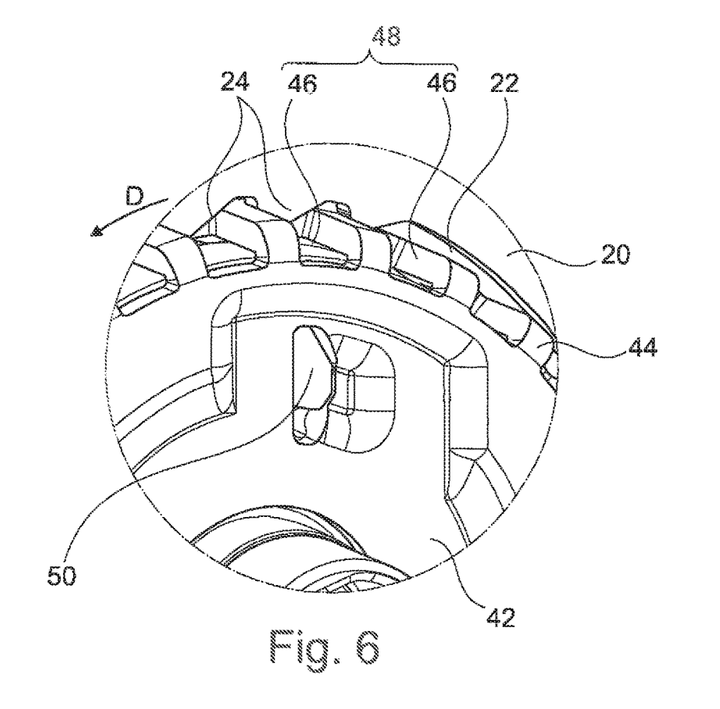
FIG. 6 shows a detailed view of the seat belt retractor of FIG. 4.

In FIGS. 1 to 3 a belt reel 10 for a seat belt retractor 12 illustrated in FIGS. 4 to 6 is shown. The seat belt retractor 12 comprises a frame 14 including a base plate 16 which has an opening 18 for mounting the seat belt retractor 12 fixedly to the vehicle as well as two parallel opposite tabs 20 each of which includes a seat 22 for the belt reel 10. At the edge of the seats 22 locking teeth 24 are provided for blocking the belt reel 10, as will be explained hereinafter.

The belt reel 10 comprises a reel body 26 onto which webbing can be wound and which is rotatable about a longitudinal axis L. At the axial ends 28, 30 of the reel body 26 a first flange 32 and a second flange 34 are provided.

The first flange 32 is coupled to a force limiter, in this case a torsion rod 38, so as to be movable together with the reel body 26 to a limited extent. For this purpose, a first end 38 of the torsion rod 36 is connected to the first flange 32 in a rotationally fixed manner (cf. FIG. 2). The opposite second end 40 of the torsion rod is coupled to the reel body 26 in a rotationally fixed manner. By rotation about the longitudinal axis L a limited rotation of the reel body 26 against the first flange 32 is possible while at the same time the torsion rod 36 is deformed. With high load acting on the webbing by a tensile force thus limited rotation of the reel body 26 against the first flange 32 is possible against the resistance of the torsion rod 36.

The second flange 34 is made from a flat sheet metal part and includes a circular wall 42 arranged radially with respect to the longitudinal axis L as well as a peripheral wall 44 which is directly adjacent to the radial wall 42 and encloses the axial end 30 of the reel body 26 in the peripheral direction. The walls 42, 44 are formed integrally with each other. The second flange 34 is reformed into a pot-shaped configuration by plastic deformation of the sheet metal part.

As is evident especially from FIG. 1, the peripheral wall 44 has plural interruptions 46 arranged at regular intervals and jointly forming a toothing 48. Said toothing 48 can interact with the locking teeth 24 of the frame 14 so as to block rotation of the second flange 34 relative to the frame.

Furthermore, at the radial wall 42 of the second flange 34 a stop 50 projecting axially against the reel body 26 is provided which is produced by embossing the sheet metal part. At the same radial distance from the longitudinal axis L a recess 52 is provided on the reel body 26 in which recess a bolt forming a stop 54 is inserted in the axial direction.

In the assembled state of the belt reel 10 the bolt is located in the direction of rotation D ahead of the stop 50, with the stops 50, 54 overlapping in the axial direction.

When the belt reel 10 is blocked by the fact that the first and second flanges 32, 34 are blocked within the frame 14, with an increasing force at first force limitation takes place by deforming the torsion rod 36. "Force limitation" in this context means controlled unwinding of webbing from the belt reel 10 so as to limit the force acting in the seat belt and to enable controlled forward movement of the vehicle occupant.

During said forcing limiting operation the reel body 26 is twisted relative to the second flange 34, wherein the stop 54, i.e. the bolt, is moved in the direction of rotation D. Said rotation is stopped when the bolt contacts the stop 50 in the direction of rotation D. In this way, after force limitation the reel body 26 is blocked against the second flange 34 so that no further webbing extension is possible.

As is evident from FIG. 4, the reel body 26 protrudes into the second flange 34 in the axial direction L so far that the axial end 30 of the reel body 26 is located in the seat 22 of the frame 14. This facilitates direct support of the reel body 26 when the belt reel 10 and, resp., the reel body 26 are blocked, i.e. reliable load transmission in the radial direction from the reel body 26 via the second flange 34 to the frame 14.

Since, as is evident from FIG. 4, the interruptions 46 at the peripheral wall 44 are interconnected by a land 56, in this blocked state the second flange 34 cannot be moved relative to the reel body 26 in the axial direction L, as the locking teeth engage in the interruptions 46. Thus, the stop 50 is reliably excluded from slipping off the bolt 54.

The structure of the belt reel 10 according to the invention thus permits, on the one hand, reliable load transmission to the frame 14 of the seat belt retractor 12; on the other hand, the second flange 34 is reliably prevented from deforming or axially slipping off.

The second flange 34 is manufactured in one piece from an especially flat sheet metal part, for example by reforming. The stop 50 as well as the interruptions 46 may be introduced to the still flat sheet metal part, for example, prior to reforming, thus substantially facilitating manufacture. It is also possible, however, to introduce the stop 50 during the reforming process.

Figure 7:
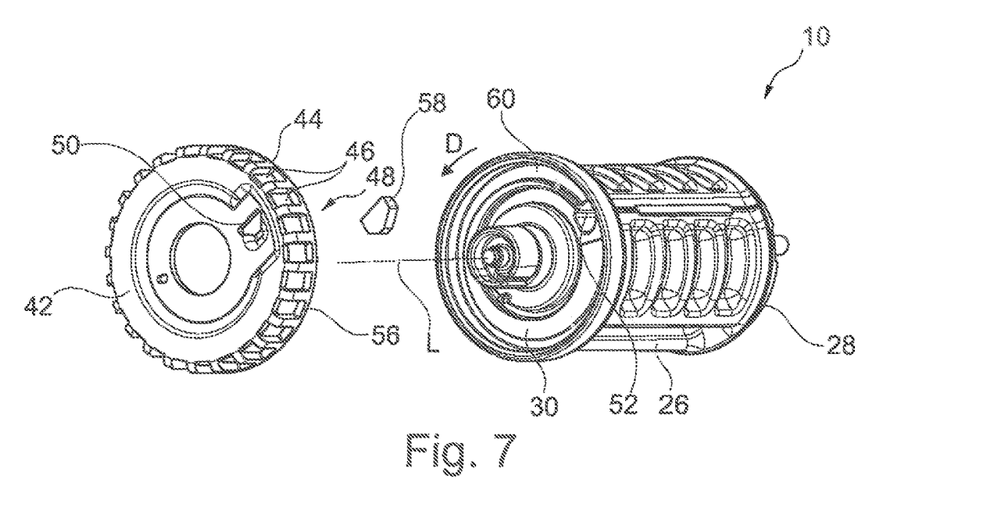
FIG. 7 shows a second embodiment of a belt reel according to the invention.
Figure 8:
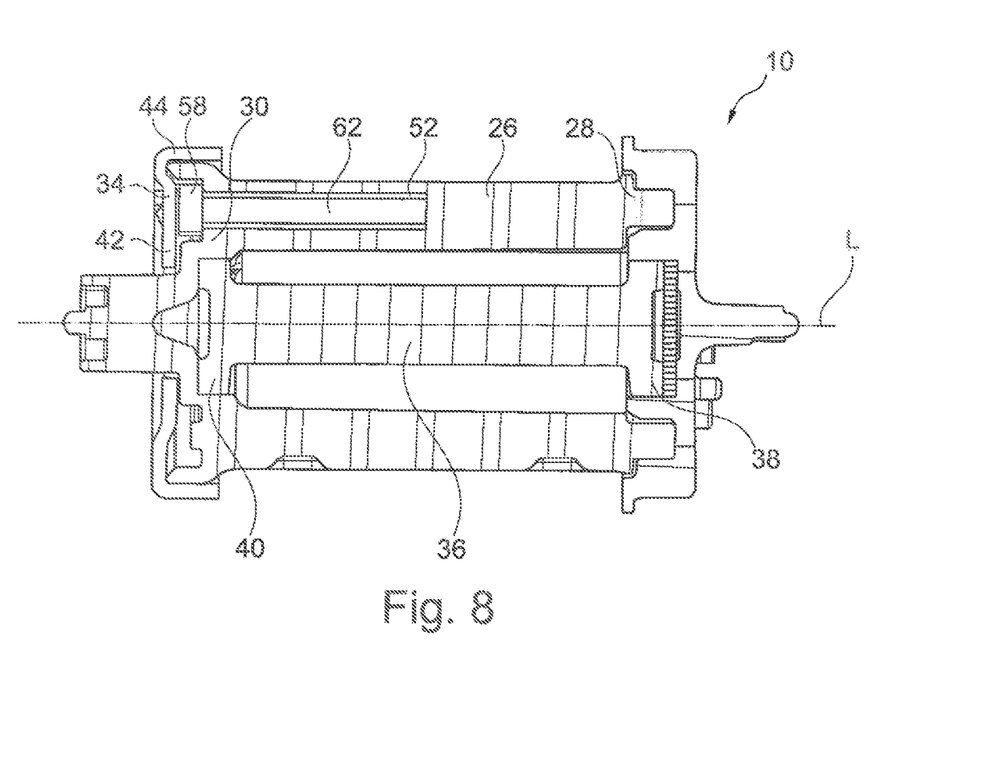
FIG. 8 shows a sectional view across the best reel of FIG. 7.
Figure 9:
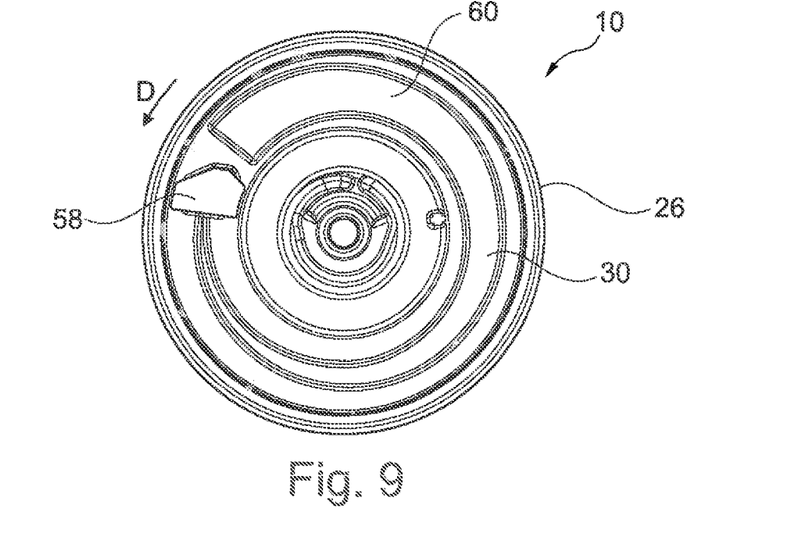
FIG. 9 shows an axial top view onto the belt reel of FIG. 8.
Figure 10:
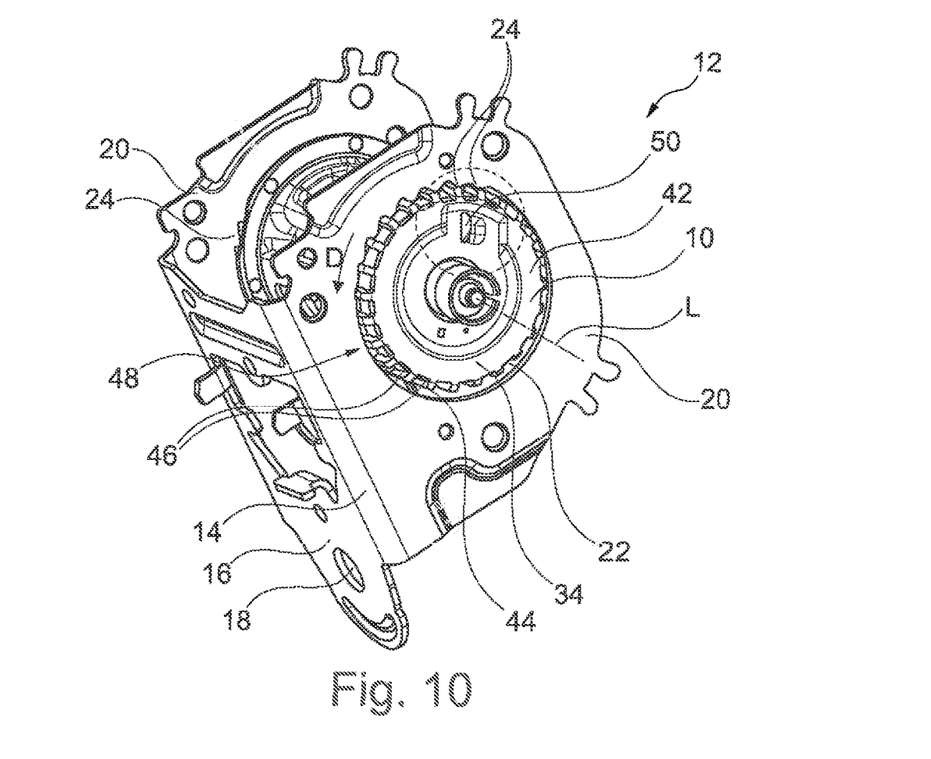
FIG. 10 shows a perspective view of a seat belt retractor comprising the belt reel of FIGS. 7 to 9.
Figure 11:
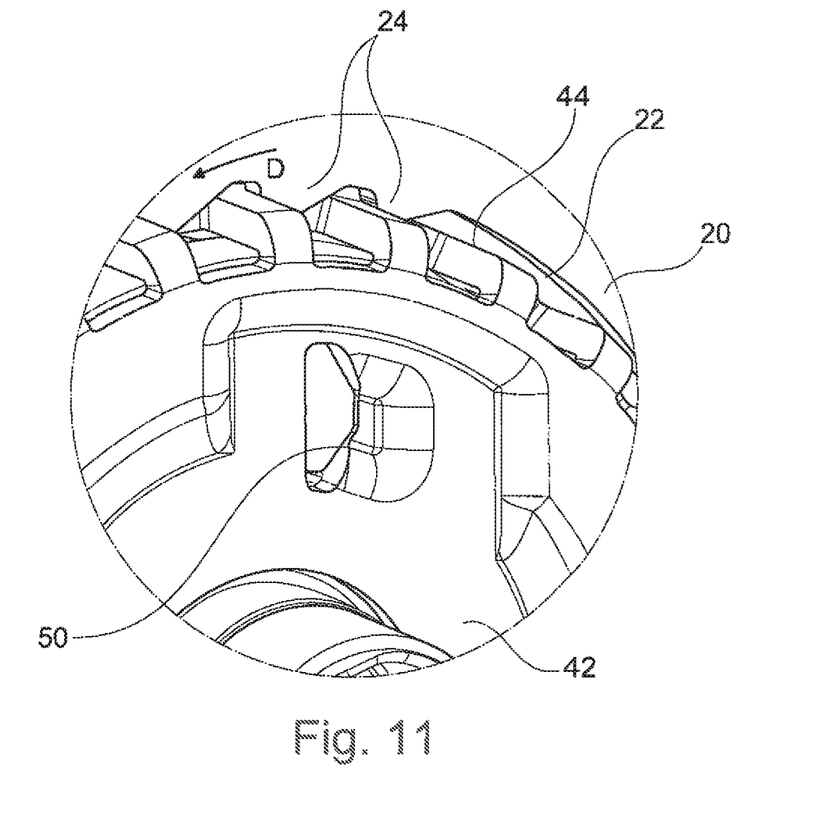
FIG. 11 shows a detailed view of the seat belt retractor of FIG. 10.

A second embodiment of a belt reel 10 according to the invention is shown in FIGS. 7 to 9. The basic structure of said belt reel 10 corresponds to the structure of the belt reel 10 as shown in FIGS. 1 to 3.

Instead of the bolt, in this case a blade 58 is used, however. The blade 58 can be radially twisted by the stop 50. The cutting edge provided at the blade 58 abrades material from the land 60 which is formed spirally at the reel. Thus, in addition to the torsion rod, further force limitation can be effectuated which moreover may also be progressive or declining.

In addition to the stops 50, it is possible that between the reel body 26 and the second flange 34 a shear pin 62 is provided which admits rotation of the second flange 34 against the reel body 26 only when a defined force has been exceeded. In this way it is ensured that force limitation by the torsion rod 36 takes place only when a predetermined force level has been exceeded.

In the case of the embodiment shown in FIGS. 7 to 9 comprising a pin 62 which is shorn, the structure of the second flange 34 including a peripheral wall 44 according to the invention in addition offers the advantage that shorn parts of the pin 62 remain within the second flange 34 and cannot drop out of the latter.

The invention claimed is:

1. A seat belt retractor (12) for a vehicle, comprising a frame (14) in which a belt reel (10) is supported which includes a reel body (26), a first flange (32) and a second flange (34), said flanges being provided at axial ends (28, 30) of the reel body (26) and each being arranged in a seat (22) of the frame (14), wherein the first flange (32) is rotatable relative to the reel body (26) and wherein a force limiter is provided between the first flange (32) and the reel body (26), and at the seat (22) locking teeth (24) are provided and at the second flange (34) a toothing (48) corresponding to the locking teeth is provided, wherein the second flange (34) is rotatable relative to the reel body (26) and at the second flange (34) and/or at the reel body (26) interacting stops (50, 54, 58) are provided which limit the rotation of the second flange (34) relative to the reel body (26), and wherein the second flange (34) includes a peripheral wall (44) which encloses the axial end (30) of the reel body (26) facing the second flange (34) in the peripheral direction.

2. The seat belt retractor according to claim 1, wherein the toothing (48) is provided on the outside of the peripheral wall (44).

3. The seat belt retractor according to claim 2, wherein the toothing (48) is formed by interruptions (46) of the peripheral wall (44).

4. The seat belt retractor according to claim 1, wherein the second flange (34) is formed by a reformed one-piece sheet metal part.

5. The seat belt retractor according to claim 1, wherein the stops (50, 54, 58) project from the second flange (34) and from the reel body (26) in the axial direction (L) in the opposite direction.

6. The seat belt retractor according to claim 1, wherein the stop (50) is formed on the second flange (34) by embossing.

7. The seat belt retractor according to claim 1, wherein the stop is formed at the reel body by a bolt (54) protruding from the reel body (26) in the axial direction (L).

8. The seat belt retractor according to claim 1, wherein the stop at the second flange (34) interacts with a blade (58).

9. The seat belt retractor according to claim 8, wherein the blade (58) abrades material from the reel body (26) and accordingly acts as an additional force limiter.

10. The seat belt retractor according to claim 1, wherein a shear pin (62) having a predetermined breaking point is provided between the second flange (34) and the reel body (26).

11. The seat belt retractor according to claim 1, wherein the force limiter is a torsion rod (36).

* * * * *